United States Patent

[11] 3,539,210

| [72] | Inventors | William C. Wehner<br>Detroit, Michigan;<br>Lawrence H. Fitch, Cahokia, Illinois; Louis P. Fister, St. Louis, Missouri |
|---|---|---|
| [21] | Appl. No. | 726,026 |
| [22] | Filed | May 2, 1968 |
| [45] | Patented | Nov. 10, 1970 |
| [73] | Assignee | Moog Industries, Inc.<br>St. Louis, Missouri<br>a corporation of Missouri |

[54] PIVOT JOINT AND RATCHET MEANS
8 Claims, 10 Drawing Figs.

[52] U.S. Cl. .................................................. 287/87
[51] Int. Cl. ...................................................... F16c 11/06
[50] Field of Search............................................ 287/90(A),
90(C), 87; 151/41, 11, 13, 39, 47, 35

[56] References Cited
UNITED STATES PATENTS

| 1,302,858 | 5/1919 | Sack............................. | 151/39 |
| 1,645,859 | 10/1927 | Hosking ....................... | 151/35 |
| 1,810,644 | 6/1931 | Dieter .......................... | 151/35 |
| 2,489,919 | 11/1949 | Merriman..................... | 151/39 |
| 3,016,248 | 1/1962 | Lindberg...................... | 151/41X |
| 3,401,962 | 9/1968 | Scheublein et al............ | 287/90(C)X |
| 3,410,587 | 11/1968 | Scheublein et al............ | 287/90(C)X |

FOREIGN PATENTS

| 511,723 | 8/1939 | Great Britain................ | 151/35 |
| 314,528 | 1/1934 | Italy .............................. | 151/35 |
| 81,355 | 6/1919 | Switzerland.................. | 151/35 |

Primary Examiner—David J. Williamowsky
Assistant Examiner—Andrew V. Kundrat
Attorney—Raymond E. Scott ABSTRACT: This disclosure relates to an automatically adjustable pivot joint, including: a housing having a stud receiving chamber, a stud head received within the chamber normally in bearing engagement with the primary bearing, adjustable secondary bearing means urging the stud head into bearing engagement with the primary bearing, and a ratchet means. The ratchet means disclosed herein includes an annular ring having a plurality of integral inwardly struck resilient ratchet tangs, extending at an acute angle to the plane of the ring, engaging teeth provided on one of the movable members of the adjustable secondary bearing, permitting adjustment and restraining movement of the member in the opposite direction.

Patented Nov. 10, 1970
3,539,210
Sheet 1 of 3
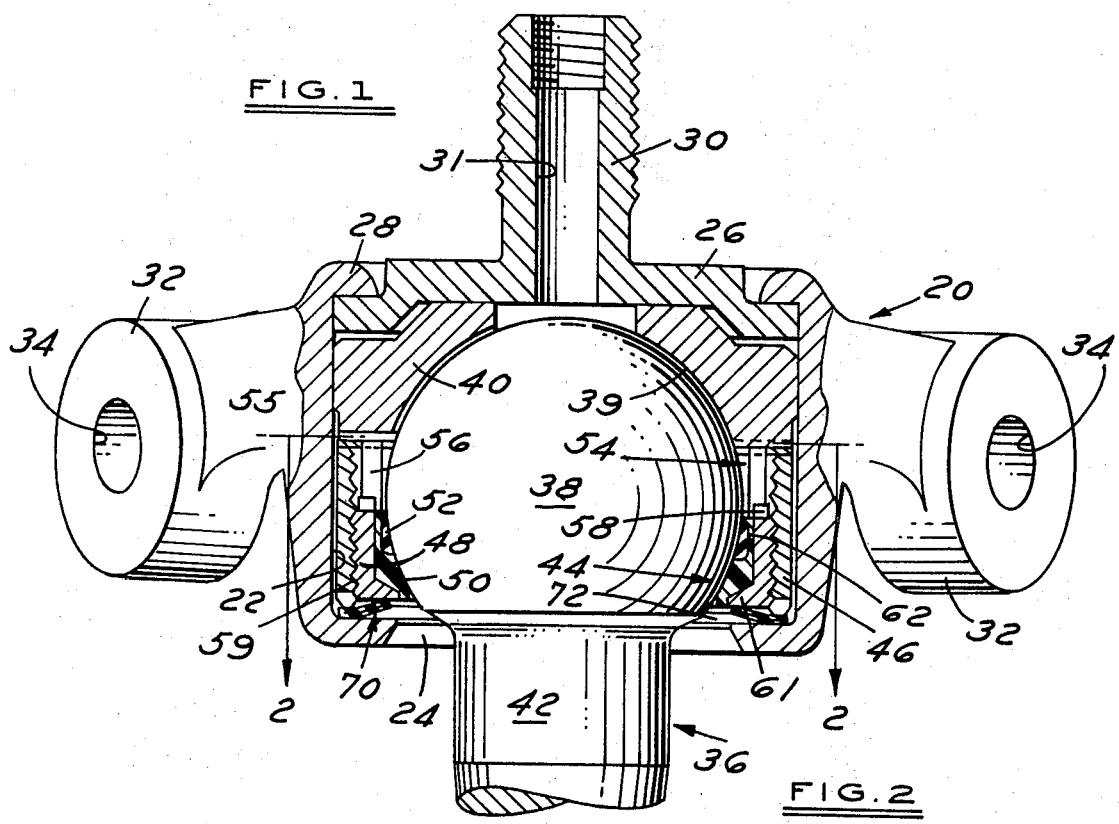
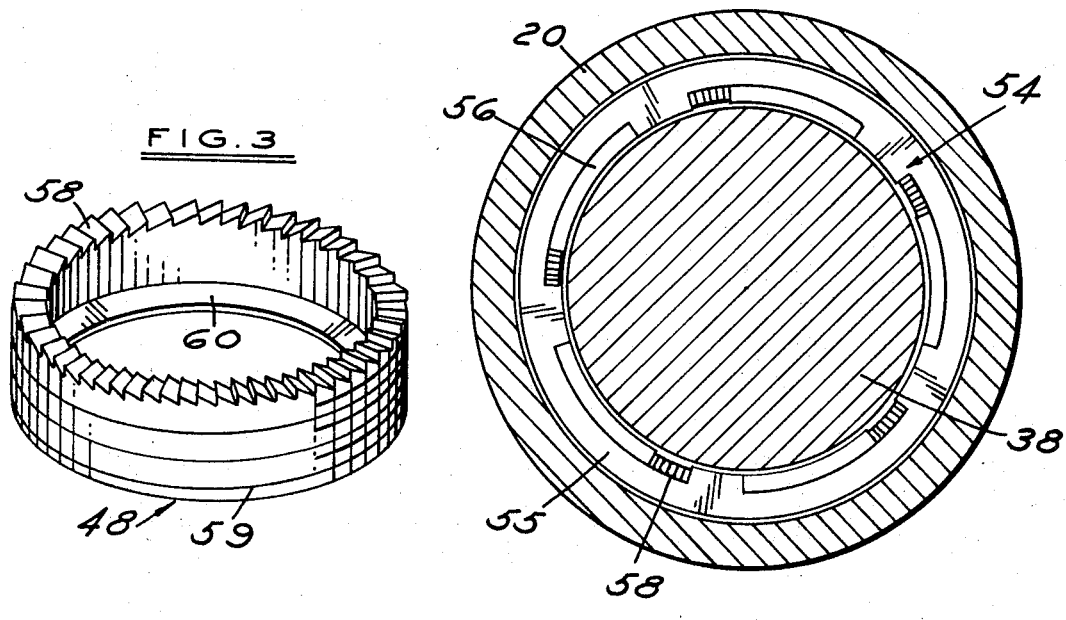
INVENTORS
WILLIAM C. WEHNER
LOUIS P. FISTER
BY LAWRENCE H. FITCH
Burton & Parker
ATTORNEYS

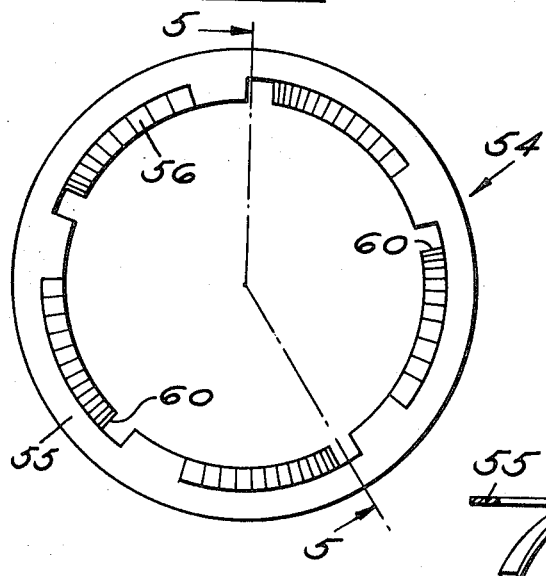
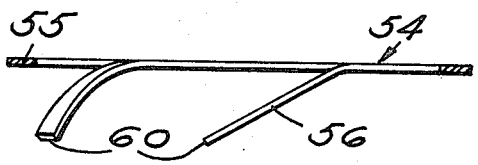
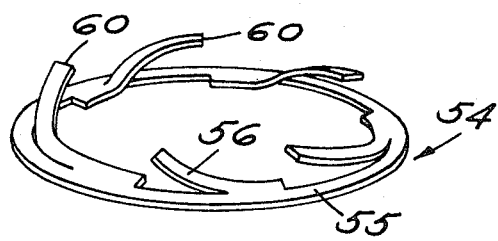
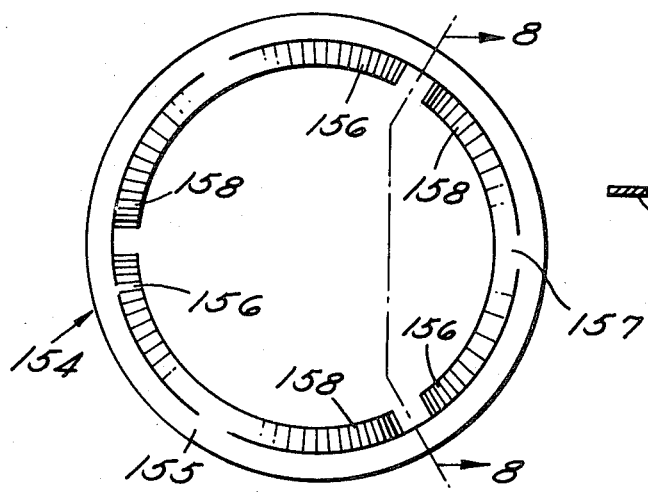
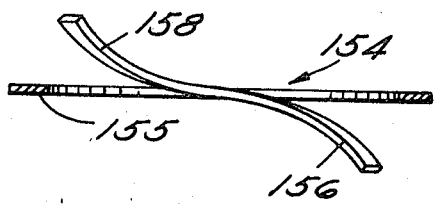

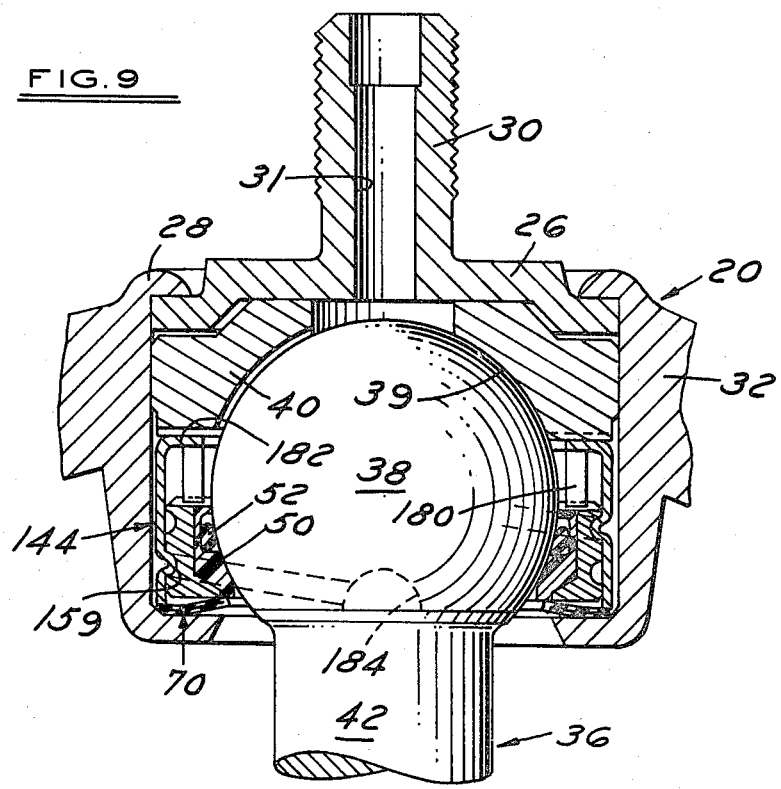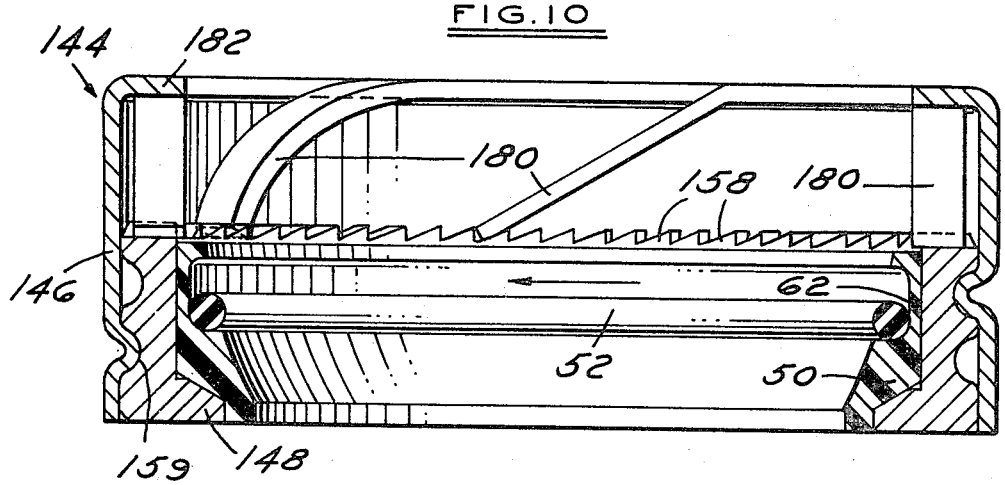

3,539,210

PIVOT JOINT AND RATCHET MEANS

FIELD OF THE INVENTION

Our invention relates to an improved pivot joint and ratchet means. More particularly, the pivot joint and ratchet means of our invention is adapted to automatically adjustable pivot joints, such as automotive ball joints, which utilize the inherent motion of the suspended structure to adjust the joint. In automotive ball joints, the motion of the suspension and steering system may be utilized for the adjustment.

DESCRIPTION OF THE PRIOR ART

Automatically adjustable pivot joints shown by the prior art generally include an energy source, such as a spring, as a part of the adjustment mechanism. Examples of such devices, including a spring, include the U. S. Pat. Nos. 3,250,555 and 3,325,197, and the copending U.S. application for patent, Ser. No. 520,484 filed Jan. 13, 1966, now U.S. Pat. No. 3,401,965 of William C. Wehner. Ball joints have, however, recently been developed which utilize the inherent motion of the automotive suspension and steering system to adjust the joint. The joint has a pair of jackscrew members which extend to compensate for wear in the joint, and an infinite ratchet means which restrains reversal of the adjustment. Examples of such devices are illustrated by the copending U.S. Pat. applications of William A. Scheublein, Jr. and Louis P. Fister, Ser. Nos. 511,609 and 560,334 filed Dec. 6, 1965 and June 24, 1966, now U.S. Pat. Nos. 3,401,962 and 3,401,966, respectively.

SUMMARY OF THE INVENTION

The automatically adjustable pivot joint of our invention includes a housing defining a chamber having an open end, a stud having a head portion received within the housing chamber normally in bearing engagement with the primary bearing defined within the housing chamber, an adjustable secondary bearing means, and a ratchet means. The secondary bearing means includes a pair of threadably adjustable members, the first of which is threadable in one direction relative to the housing to urge the stud head portion into bearing engagement with the primary bearing, and the second is fixed within the housing. The ratchet means is disposed between the primary and secondary bearings, and has a plurality of resilient tangs which extend toward and contact the first movable member of the secondary bearing to permit relative threaded movement of the first member in the first mentioned direction, and restrain threaded movement in the opposite direction. The ends of the tangs of the ratchet means lie in a common plane which is generally parallel to the engaging surface of the first member of the secondary bearing.

The preferred embodiment of the ratchet means of our invention includes an annular ring, which is positioned between the primary and secondary bearings, and a plurality of tangs which are struck inwardly from the ring to define an acute angle with the plane of the ring. The ring and the integral tangs are formed from a resilient material which permits resilient biasing of the tangs generally perpendicular to the plane of the ring, while restraining movement parallel to said plane. The tangs may be uniformly spaced about the axis of the ring, and are preferably struck from the inner edge of the ring. In the disclosed embodiment of our invention, the tangs face in the same direction, in the circumference of the ring, and lie in a common plane generally parallel to the axis of the ring. In the resultant structure, the tangs extend generally helically to lie in the aforementioned common plane.

According to one embodiment of our invention, the ring is integral with one of the threaded members of the secondary bearing. In the other embodiment, the ring is separate from the secondary bearing, and the radial width of the tangs are substantially equal to the radial width of the ring. The ratchet means of our invention is merely dropped into the joint during assembly, and does not require any special tools or assembly procedures. According to one embodiment of the ratchet means, the resilient ratchet tangs extend above and below the plane of the ring, such that the ratchet means may be assembled in either position.

The ratchet means of our invention is easily assembled, and may be formed from a single stamping or the like. The resultant structure provides a positive restraint of reverse motion, while permitting adjustment by the inherent motion of the suspended structure alone. Other advantages and meritorious features of this invention will more fully appear from the following specification, claims, and accompanying drawings, wherein:

FIG. 1 is a partially cross-sectioned side view of a pivot joint utilizing our invention;

FIG. 2 is a top cross-sectional view of the embodiment shown in FIG. 1, in the direction of view arrows 2-2;

FIG. 3 is a perspective view of the ratchet engaging surface of one of the secondary bearing members;

FIG. 4 is a top view of one embodiment of the ratchet means of this invention;

FIG. 5 is a side cross-sectional view of the ratchet means shown in FIG. 4, in the direction of view arrows 5-5;

FIG. 6 is a perspective view of the ratchet means shown in FIGS. 4 and 5;

FIG. 7 is a top view of another embodiment of the ratchet means of our invention;

FIG. 8 is a side cross-sectional view of the ratchet means shown in FIG. 7, in the direction of view arrows 8-8;

FIG. 9 is a partially cross-sectioned view of another embodiment of the pivot joint of our invention; and FIG. 10 is a side cross-sectional view of the secondary bearing and ratchet means shown in FIG. 9.

DESCRIPTION OF THE PREFERRED EMBODIMENTS

The ball joint assembly and ratchet means shown in FIGS. 1 to 6 includes a housing 20 defining a stud head receiving chamber 22. One end of the housing chamber is closed by a cover 26, which is secured by a flange 28, which may be spun in place as shown and the opposite end 24 is open to receive the shank of the stud. The cover is provided with a threaded boss 30 adapted to receive lubricant for the joint through the threaded opening 31, and the housing is provided with a pair of angularly related "ears" 32 having apertures 34 for bolting the assembly to another structural member, such as an automotive "A" frame. The ball stud 36 has a head portion 38, received in the housing chamber 22, in bearing engagement with the spherical surface 39 of the primary bearing 40. The shank portion 42 of the stud extends out of the housing chamber through the open end 24.

The secondary bearing means, indicated generally at 44, is responsive to relative motion between the stud 36 and the housing 20 to adjust the spacing between the stud head 38 and the primary bearing 40. The ball joint illustrated in FIGS. 1 and 2 is a "compression loaded" ball joint; so called because the stud head is normally in compression with the primary bearing 40. In automotive ball joints for example, the stud head is normally compressed against the primary bearing by the weight of the vehicle. In a "nonadjustable" ball joint, the stud head will be spaced from the bearing surface of the secondary bearing because of manufacturing tolerances, and subsequent frictional wear between stud head and the primary bearing. The ball head may therefore be "lifted" from the primary bearing during shock and vibrational loading, such as occurs in automotive suspension systems, causing destructive impact loading between the stud head and the primary bearing. Previously, this condition was thought to be alleviated by compressing the stud head against the primary bearing with a conical spring or the like, however the large impact forces developed in an automotive ball joint easily overcome the compressive force of a spring.

The adjustable secondary bearing means of this embodiment of our invention includes a stationary annular female jackscrew member 46, a relatively movable male threaded jackscrew member 48 having a bearing insert 50 and an O-ring 52, and a ratchet means indicated generally at 54. The ratchet means permits unidirectional threaded adjustment of the male jackscrew member 48, toward the primary bearing 40, upon relative motion of the stud 36.

The ratchet means 54 of this embodiment includes an annular ring 55, and a plurality of inwardly struck resilient fingers or tangs 56 which extend at an acute angle from the plane of the ring. The ring is secured between the stationary jackscrew member 46 and the primary bearing 40, as shown in FIG. 1, and the tangs are struck from the inner edge of the ring to engage teeth 58 provided on the movable jackscrew member 48. The ends 60 of all the tangs face in the same direction, and lie in a common plane which is generally parallel to the plane of the ring 55 and the opposed surface of the movable jackscrew member 48.

The O-ring 52 and the bearing insert 50, which may be formed from a deformable resilient material such as nylon or Delrin, frictionally engage the stud head 38. The insert 50 is contained by the annular lip 61 of the female jackscrew member 48, which may be metallic as shown, to prevent "cold flow" of the insert under compression. The relatively thin wall 62 of the insert, behind the O-ring prevents abrasive contact between the O-ring and the male jackscrew member 48, and prevents extrusion or cold flow of the plastic insert. This is a function of a plastic material subject to cold flow; that a thin wall is less subject to cold flow under pressure than a relatively thick wall. The frictional contact between the stud head 38 and the bearing insert 50 and O-ring 52 causes the movable jackscrew member to turn in response to turning motion of the stud head, provided the frictional contact is greater than the frictional resistance of the threads 59, and provided the stud head turns in the direction of movement that is not restrained by the ratchet spring 54, such as described in the copending application of Scheublein et al., Ser. No. 511,609. The movable jackscrew assembly may also be caused to turn upon shock or vibrational loading of the suspension system, depending upon the frictional contact between the O-ring and the insert with the stud head 38, and the pitch of the threads 59.

The ratchet means 54 permits threaded motion of the secondary bearing 44 toward the primary bearing 40, to adjust for frictional wear and manufacturing tolerances, and prevents reverse threading. The tangs engage the teeth on the male jackscrew, as shown in FIG. 10. The resiliency of the ratchet tangs permits motion of the jackscrew assembly in the direction of the arrow, which biases the tang toward the plane of the ring. Reverse motion is restrained by the tangs because the force is transmitted generally through the axis of the ends of the tangs. The assembly thus provides unidirectional adjustment of the ball joint by the inherent motion of the suspended structure.

In the preferred embodiment of the ratchet assembly of our invention, the number of teeth 58 on the movable jackscrew member is not divisible by the number of tangs 56 or the ratchet means, such that the assembly provides a very fine adjustment. For example, the ratchet spring 54 may be provided with five tangs, and the jackscrew member 48 may be provided with 48 teeth. Theoretically, in this combination, only one tang will engage a jackscrew member tooth at a time, and the remainder will be spaced along the opposed surfaces of the teeth, providing an adjustment equivalent to five times the number of teeth on the jackscrew member. This is an important feature in an adjustable ball joint, because the wear to be compensated will be only a few ten thousandths of an inch.

The embodiment of the ball joint shown in FIG. 1 includes an annular seal 70 which permits flushing of lubricant from within the joint, and prevents entry of foreign contaminants, such as water and dirt. The seal is secured beneath the female jackscrew member 46, and the annular lip 72 sealingly engages the movably jackscrew member 48, and follows the adjustment of the movable jackscrew member. It can be seen from FIG. 1, that the seal may easily be biased toward the axis of the stud head to permit flushing of the lubricant from within the joint, while the seal is not easily biased in the opposite direction. This seal is discussed more fully in a copending application for patent.

The ratchet means 154 shown in FIGS. 7 and 8 is similar to the ratchet means 54 described hereinabove, except that the ratchet spring is designed to be reversible within the joint, and thereby eliminate as assembly error which would require discarding an improperly assembled joint. The ratchet spring of this embodiment has an even number of tangs, six in this embodiment, struck from the inner edge of the ring 155. Half of the tangs 156 extend at an acute angle from one side of the ring, and the remainder of the tangs 158 extend at an acute angle from the opposite side. In the assembled joint, the tangs which extend toward the primary bearing, 40 in FIG. 1, are biased by the primary bearing to lie in substantially the plane of the ring, resulting in a structure which is the same as shown in FIG. 1. The remainder of the tangs extend to engage the teeth 58 provided on the movable jackscrew member 48 to provide the unidirectional restraint to threaded motion described hereinabove.

In the preferred embodiment of the reversible ratchet spring, the tangs are arranged in pairs, and extend from a common point 157, in opposite directions. Thus, the upper half is the "mirror image" of the other, as shown in FIG. 8, when viewed perpendicular to the ring, and the ratchet is reversible within the joint. This relationship permits assembly of the ratchet in either position, and eliminates costly assembly errors.

The embodiment of our invention shown in FIGS. 9 and 10 utilizes the basic components described hereinabove, and the drawings have been numbered accordingly. The primary distinction is that the female or stationary jackscrew member 146 in this embodiment is integral with the ratchet means. The female jackscrew member may be formed from a single cup-shaped metal stamping having a plurality of tangs 180 struck inwardly from the inner edge of the ring-shaped portion 182; which would be functionally equivalent to the ring 55 and the tangs 56 shown in FIGS. 1 to 6. The threads 159 are formed in the stamping, and the movable or male jackscrew member 148 has mating "chord" threads. The stamping is provided with a grease channel 184 for flushing the joint. The advantages of this embodiment include the reduction in cost caused by the simplification of manufacturing the female jackscrew member, and the simplification of the assembly procedure provided by the integral female jackscrew member and ratchet means. The secondary bearing assembly of this embodiment may thus be stored after assembly, and assembled in the joint merely by dropping the assembly into the housing; thus substantially reducing the chances of misassembly.

It will be understood by those skilled in the art that the use of the terms "ball joint", "ball stud", "ball head", etc. used hereinabove and in the claims is intended as generic to swivel joints having a stud provided with at least a partially spherical head as herein disclosed, and is not intended to be limited to spherical "balls" as shown in the drawings, or a stud having a spherical "ball head". It will also be understood that various modifications may be made to the disclosed embodiments without departing from the purview of the appended claims. For example, the male jackscrew member 48, shown in FIG. 1, may be made integral with the bearing insert 50, provided a suitable material may be found.

I claim:

1. An automatically adjustable pivotal joint, comprising: a housing defining a chamber having an open end, a stud having a head portion received within said housing chamber normally in bearing engagement with a primary bearing defined within said housing chamber, a secondary bearing including a pair of threadably adjustable members, the first of said members threadable in one direction relative to the second member to urge said stud head portion into bearing engagement with the primary bearing, and a ratchet means disposed between said primary and secondary bearings having a plurality of resilient tangs extending toward said first member with the ends of said tangs lying in a common plane generally parallel to an opposed surface of said first member having a plurality of teeth such that said tangs permit relative threaded movement of said first member in said one direction and restrain threaded movement of said first member in the opposite direction.

2. The automatically adjustable pivotal joint defined in claim 1, characterized in that said ratchet means includes an annular ring, and said ratchet tangs are struck from the radial inner edge of said ring.

3. The automatically adjustable pivotal joint defined in claim 2, characterized in that said ring is integral with said second member.

4. The automatically adjustable pivotal joint defined in claim 2, characterized in that said ring is restrained between said second member and said primary bearing.

5. The automatically adjustable pivotal joint defined in claim 2, characterized in that a number of said ratchet tangs normally extend at an acute angle from the plane of said ring towards said first member and the remainder extend towards said primary bearing.

6. The automatically adjustable pivotal joint defined in claim 1, characterized in that the number of teeth on said first member is not divisible by the number of tangs of said ratchet means.

7. A ratchet means for a self-adjusting ball joint having a pair of threadably telescopic members, comprising: a threaded annular cup-shaped ring portion adapted to support the ratchet means within the self-adjusting ball joint, and having a plurality of integral inwardly struck resilient ratchet tangs extending into the cup-shaped ring portion at an acute angle to the plane of the ring and having end portions extending generally parallel to the plane of the ring portion adapted to engage one of the threadably telescopic members to prevent threaded movement thereof in one direction, and permit threaded movement in the opposite direction.

8. The ratchet means defined in claim 7, characterized in that each of said resilient ratchet tangs extend helically in the same direction about the axis of said annular ring portion.